Patented Dec. 7, 1948

2,455,668

UNITED STATES PATENT OFFICE 2,455,668

MINERAL OIL COMPOSITION

Everett W. Fuller and Henry S. Angel, Woodbury, N. J., assignors to Socony-Vacuum Oil Company, Incorporated, a corporation of New York No Drawing. Application May 3, 1945,
Serial No. 591,840

18 Claims. (Cl. 252—46.6)

This invention has to do with the stabilization of viscous mineral oil fractions against the deleterious effects of oxidation or deterioration with use by the addition thereto of oxidation inhibitors. More specifically, the present invention is directed to the improvement of viscous mineral oil fractions by the use of a combination of such inhibitors, namely, a primary oxidation inhibitor and a secondary inhibitor, which when admixed with a viscous mineral oil in minor proportions will prevent or delay undesirable changes taking place in the oil.

As is well known to those familiar with the art, substantially all of the numerous fractions obtained from mineral oils and refined for their numerous uses are susceptible to oxidation. The susceptibility of an oil fraction to oxidation and the manner in which oxidation manifests itself within the oil varies with the type and degree of refinement to which the oil has been subjected and with the conditions under which it is used or tested. That is, the products formed in an oil fraction as a result of oxidation and the degree to which they are formed depends upon the extent to which the various unstable constituents or constituents which may act as oxidation catalysts have been removed by refining operations, and also upon the conditions of the use.

The present invention is predicated upon the discovery that the oxidation characteristics of viscous mineral oil fractions are greatly improved by the incorporation therein of minor proportions of each of two inhibitors which are designated herein as primary oxidation inhibitors and secondary inhibitors.

The primary oxidation inhibitors contemplated herein are phosphorus- and sulfur-containing reaction products obtained by reaction, at a temperature above about 100° C., of a phosphorus sulfide and a dicyclic terpene or a material predominantly comprised of a dicyclic terpene.

All of the phosphorus sulfides, such as $P_3S_6$ (or $PS_2$), $P_4S_6$ (or $P_2S_3$), $P_4S_3$, $P_2S_5$, $P_4S_7$, $P_4S_{10}$, etc. are contemplated as reactants in the preparation of primary oxidation inhibitors; however, $P_2S_5$ is particularly preferred. As used herein the designation "dicyclic terpene" refers to those terpenes which are characterized by the presence of one double bond in the molecule and are built up of two ring systems. Illustrative of such compounds are pinene, camphene and fenchene. Also contemplated as coming within this particular designation are those materials which are predominantly comprised of one or more dicyclic terpenes; representative of such materials are the essential or volatile oils which are predominantly comprised of such a terpene or terpenes and are typified by turpentine oil, the predominant constituent of which is pinene. Particular preference is accorded to pinene and turpentine oil.

It is also to be understood that the aforesaid designation "dicyclic terpene" is not inclusive of such terpenes as those known in the art as monocyclic terpenes, which are typified by dipentene and terpinolene. Finally the dicyclic terpenes are not to be confused with the olefin hydrocarbon terpenes such as myrcene.

Although a complete understanding of the chemical composition of the reaction products of phosphorus sulfides and dicyclic terpenes is not realized at this time, a partial understanding of their composition may be realized by noting the characteristics involved in the reaction. For example, the reaction of phosphorus pentasulfide and pinene commences at about 100° C. and is exothermic in nature. During the reaction, the reaction mixture increases appreciably in viscosity and little if any hydrogen sulfide is evolved therefrom. The reaction product obtained in this reaction contains phosphorus and sulfur in substantially the same amounts as in the phosphorus sulfide used. It would appear then that the reaction is one of addition, that is, addition of phosphorus sulfide to the one unsaturated bond present in pinene.

While the reaction temperature for the reaction described above should be one of at least about 100° C., the preferred temperatures fall within the range of about 100° C. to about 160° C.

The proportions of reagents used in the preparation of the primary oxidation inhibitors may be varied in order to prepare reaction products having different degrees of oil solubility and different degrees of oil improving power. In this regard, it is preferred that about one mol of phosphorus sulfide be reacted with four mols of a dicyclic terpene in order to obtain a reaction product relatively soluble in petroleum oils. For example, when more thone one mol of $P_2S_5$ is used with four mols of pinene, a viscous gel-like reaction is obtained and this product is definitely insoluble in petroleum oils. Also when less than one mol of $P_2S_5$ is used with four mols of pinene a viscous oil somewhat insoluble in mineral oils is obtained, after the unreacted pinene has been removed by distillation. Accordingly, it is to be understood that while effective primary oxidation inhibitors can be obtained by using different ratios of reactants, particularly preferred inhibitors are those obtained by using approximately one mol of a phosphorus sulfide for about four mols of a dicyclic terpene.

There is, however, still another desirable procedure for preparing the primary oxidation inhibitors. In order to obtain a relatively non-viscous reaction product, a blend of dicyclic terpene, such as pinene, and a comparatively inert solvent, such as petroleum oil, may be treated as described above to provide an oil blend of the reaction product. The preferred procedure of this type involves the use of a 1:1 blend of dicyclic terpene and petroleum oil with a phosphorus sulfide; the molar ratio of said terpene to said sulfide being about 4:1.

The aforesaid primary oxidation inhibitors effect improvement of several of the oxidation characteristics of viscous mineral oil fractions when used therein in small amounts, improvement during use being effected, for example, by the prevention of corrosion of hard metal bearings, the inhibition of acid formation, the inhibition of formation of gummy deposits in engines, the inhibition of increase in viscosity, etc. Such oil fractions containing only primary oxidation inhibitors, however, are undesirable from the standpoint of solubility stability, or resistance to haze formation. On standing for several days or when heated and then left to stand, an oil composition comprised of a viscous mineral oil fraction and a primary oxidation inhibitor tends to become cloudy. This shortcoming has now been overcome by incorporating a small amount of a secondary inhibitor in such an oil composition.

The secondary inhibitors of this invention which are capable of regulating or preventing the aforesaid haze problem are esters of organic carboxylic acids and wax-substituted hydroxyaromatic compounds. While the foregoing langauge is an accurate definition of the esters contemplated herein, they may also be designated as esters obtained by reacting an acid chloride (corresponding to the organic carboxylic acid) with a wax-substituted hydroxyaromatic compound; this is the preferred method for preparing the esters. Typical esters of this class are those obtained by reaction of benzoyl chloride and wax-substituted phenols, the esters being identified as wax-substituted phenyl benzoates. Preferred, for the purposes of this invention, in view of their outstanding cooperative action with the aforesaid primary oxidation inhibitors, are wax-substituted phenyl benzoates and phthalates, particularly preferred of which are the tetrawax substituted benzoates and phthalates. Inasmuch as those esters are well known in the art and are described at length in Patents Nos. 2,048,465, 2,048,466 and 2,138,809, issued to Orland M. Reiff and Darwin E. Badertscher, it is believed to be unnecessary to do other than briefly illustrate the same hereinafter.

The particularly preferred compositions of primary and secondary inhibitors in viscous mineral oil fractions which are contemplated herein are those in which the primary inhibitor is a $P_2S_5$-pinene reaction product or a $P_2S_5$-turpentine oil reaction product, and the secondary inhibitor is either tetrawax-substituted phenyl benzoate or tetrawax-substituted phenyl phthalate.

To illustrate the primary oxidation inhibitors contemplated herein several typical inhibitors of this class were prepared as described in Examples I through IV which follow.

EXAMPLE I

Two hundred grams (1.47 mol) of pinene and 41 grams (0.185 mol) of $P_2S_5$ were warmed together with stirring for 1 hour with rising temperature, the maximum temperature being 160° C. There was practically no evolution of hydrogen sulfide during the reaction and the reaction mixture was a dark-orange, viscous oil. On distillation at 5 mms. pressure and maximum temperature of 150° C., 70 grams (0.51 mol) of pinene were recovered. The residual oil was analyzed and found to contain 16.7 per cent sulfur and 6.0 per cent phosphorus. This product will be referred to hereinafter as Product I.

EXAMPLE II

A blend of 100 grams of pinene and 100 grams of a motor oil (Saybolt Universal viscosity (S. U. V.) of 45 seconds at 210° F.) was heated with 41 grams of $P_2S_5$, the molar ratio of pinene to $P_2S_5$ being 4:1. An exothermic reaction took place with the temperature rising to a maximum of 190° C. for a few minutes. The reaction mixture was filtered after it had been cooled and after several grams of clay were added thereto. The filtrate was a viscous oil containing 11.7 per cent sulfur and 4.78 per cent phosphorus. This product is identified hereinafter as Product II.

EXAMPLE III

Eight hundred grams of pinene and 800 grams of a motor oil (Saybolt Universal viscosity (S.U.V.) of 45 seconds at 210° F.) were heated to 105° C. with stirring. 326.4 grams of $P_2S_5$ (a ratio of 4 mols of pinene to 1 mol of $P_2S_5$) were added slowly, the temperature rising to 115° C. because of the exothermic reaction. The mixture was then heated to 150° C. for 1 hour, 32 grams of clay were added and resultant mixture filtered. The filtrate weighed 1842 grams and was then distilled to 150° C. at 5 mms. pressure. In this way 149 grams of unreacted pinene were recovered. The remaining product, 1693 grams, was a clear, viscous oil containing 12.5 per cent sulfur and 5.1 per cent phosphorus. This product is referred to hereinafter as Product III.

EXAMPLE IV

The procedure described in Example III above was carried out with gum spirits of turpentine oil, used in place of pinene. The final product was similar to that obtained with pinene but was slightly cloudy in appearance. It contained 11.8 per cent sulfur and 4.8 per cent phosphorus, and is referred to hereinafter as Product IV.

The reaction involved in the preparation of the reaction products contemplated herein, and illustrated by the foregoing examples, is novel inasmuch as it is characteristic of only some of the terpenes. As shown above, this reaction is characteristic of the dicyclic terpenes. It is not, however, characteristic of the monocyclic terpenes, nor is it operative for all aromatic compounds containing one or more unsaturated side-chains. For example, a very different reaction takes place between a phosphorus sulfide and a monocyclic terpene when the reaction conditions are those used in the preparation of the contemplated reaction products of dicyclic terpenes. This is illustrated by the reaction between $P_2S_5$ and dipentene, a typical monocyclic terpene characterized by two unsaturated bonds, described below in Example V.

EXAMPLE V

One hundred grams of dipentene, 100 grams of petroleum oil and 41 grams of $P_2S_5$ were contacted as described in Example III above. A considerable evolution of hydrogen sulfide occurred throughout the reaction and the walls of the reaction vessel were coated with an insoluble sludge. Only 76 per cent of the weight of the reactants was recovered, the product being a viscous, cloudy oil which did not give a clear 1 per cent solution in a petroleum oil. On analysis it was found to contain 6.8 per cent sulfur and 2.9 per cent phosphorus, an indication that an appreciable portion of the phosphorus and sulfur present in the $P_2S_5$ used was lost in the reaction. This loss was to insoluble sludge and gaseous products such as hydrogen sulfide.

The procedure shown in Example V was also followed with another typical monocyclic terpene, terpinolene, and the results were similar to those shown in that example; that is, considerable hydrogen sulfide was evolved during the reaction, an insoluble sludge was formed, and there was a loss of phosphorus and sulfur.

That the reaction involved in the preparation of the dicyclic terpene-phosphorus sulfide reaction products contemplated herein is specific to the dicyclic terpenes is further evidenced by the fact that an olefinic hydrocarbon terpene, typified by myrcene, reacts with a phosphorus sulfide in a manner analogous to that of the monocyclic terpenes. Furthermore, terpene alcohols, such as terpineol, and terpene ketones, such as fenchone, reacted with phosphorus sulfides in the same manner as did the monocyclic terpenes, as typified by dipentene and terpinolene.

Illustrative of the esters contemplated herein is tetrawax-substituted phenyl benzoate described below in Example VI.

EXAMPLE VI

Tetrawax-Substituted Phenyl Benzoate

(a) Preparation of chlorwax

Petroleum wax of A. S. T. M. melting point of 126° F. (52° C.), and having a molecular weight of about 350, was chlorinated by introducing chlorine at about 150° F. (c. 65° C.) until 18% by weight of chlorine was absorbed.

(b) Preparation of wax-phenol

One hundred grams of the chlorwax obtained in (a) were mixed with 12 grams of phenol, and 3 grams of $AlCl_3$ were added at about 65° C. at a rate slow enough to avoid excessive foaming caused by the evolution of hydrogen chloride. The reaction temperature was then raised to about 175° C. and the mixture was stirred for about one hour at this temperature to complete the reaction. The product at this stage was the aluminum phenate of wax-phenol (4-18); and this product was hydrolyzed with water containing small amounts of alcohol, such as butanol, whereupon tetrawax-phenol or wax-phenol (4-18) was obtained.

Parenthetical expressions (A-B), such as (4-18) above, are used in connection with the wax-substituted hydroxyaromatic compounds, and the esters obtained therefrom, to designate: (A) the number of atomic proportions of chlorine in chlor-aliphatic material reacted with one mol of hydroxyaromatic compound in the Friedel-Crafts reaction, and (B) the chlorine content of the chlor-aliphatic material. In this example, A=4 and B=18.

(c) Preparation of tetrawax-substituted phenyl benzoate

One hundred grams of wax-phenol (4-18), obtained in (b) above, were reacted with about 15 grams of benzoyl chloride for about twenty minutes, with the temperature ranging from about 125° C. to about 150° C. The reaction product was then washed with water containing small amounts, as about 2%, of butanol. The product so obtained is wax-phenyl benzoate (4-18), also designated tetrawax-substituted phenyl benzoate (4-18). For ease in handling, this product was blended with one half its weight of S. A. E. 10 grade mineral oil.

That oil compositions comprising only a viscous mineral oil fraction and a typical primary oxidation inhibitor have a tendency to develop a haze is illustrated by test results set forth in Table 1 below. These tests also reveal that a small amount of a typical secondary inhibitor effectively corrects this undesirable characteristic when added to the oil fraction containing the primary inhibitor. These tests further demonstrate that wax-phenols, and esters of the type contemplated herein but with shorter chain alkyl substituents, are ineffective in retarding haze. The oil used in this test was a paraffin oil having a Saybolt Universal viscosity of 45 seconds at 210° F. The test samples were maintained at room temperature (20–25° C.) and the number of days before haze developed in each was noted. The results of these tests are presented below in Table 1.

*Table 1*

| Primary Inhibitor | Conc. (Wt. Per Cent) | Secondary Inhibitor | Conc. (Wt. Per Cent) | Appearance |
|---|---|---|---|---|
| Product III | 1.0 | | | Haze in 6 days. |
| Do | 1.0 | Wax-phenyl benzoate (4-18), 2:1 blend in mineral oil (S. U. V.=45 secs. @ 210° F.). | 0.33 | No haze in 29 days. |
| Do | 1.0 | Wax-phenyl phthalate (4-12) | 0.33 | Do. |
| Do | 2.0 | | | Haze in 6 days. |
| Do | 2.0 | Wax-phenyl benzoate (4-18), above | 0.66 | No haze in 29 days. |
| Do | 2.0 | Wax-phenyl phthalate (4-12) | 0.66 | Do. |
| Do | 3.0 | | | Haze in 1 day. |
| Do | 3.0 | Wax-phenyl benzoate (4-18), above | 1.0 | No haze in 29 days. |
| Do | 3.0 | Wax-phenyl phthalate (4-12) | 1.0 | Do. |
| Do.[1] | 1.0 | | | Haze in 6 days. |
| Do.[1] | 1.0 | Wax-phenol (3-14) | 0.33 | Haze in 7 days. |
| Do.[1] | 1.0 | do | 1.0 | Do. |
| Do.[1] | 3.0 | | | Haze in 1 day. |
| Do.[1] | 3.0 | Diamylphenyl benzoate | 0.63 | Do. |

[1] Product III here is from a separate batch, but prepared essentially by the method described in Example III above.

The results shown above in Table 1 demonstrate that haze formation in oil containing a primary oxidation inhibitor, a pinene-$P_2S_5$ reaction product, is appreciably inhibited by adding thereto a small amount of the secondary inhibitor. The cooperative action of the two inhibitors is also demonstrated by similar test results obtained by mixing a primary oxidation inhibitor and a secondary inhibitor and then adding the resulting mixture to the oil (S. U. V.=45 seconds at 210° F.). The latter results are shown in Table 2 following.

*Table 2*

| Primary Inhibitor | Conc. (Wt. Per Cent) | Secondary Inhibitor | Conc. (Wt. Per Cent) | Appearance |
|---|---|---|---|---|
| Product III | 1.0 | | | Haze in 7 days. |
| Do | 1.0 | Wax-phenyl benzoate (4–18), 2:1 blend in mineral oil (S. U. V.=45 secs. @ 210° F.). | 0.1 | Haze in 16 days. |
| Do | 1.0 | ----do---- | 0.33 | Haze in 37 days. |
| Do | 1.0 | ----do---- | 1.0 | No haze in 77 days. |

As contemplated herein, outstanding oil compositions are obtained by incorporating in an oil a product obtained by reacting a primary oxidation inhibitor with a secondary inhibitor. A product of this type is illustrated below in Example VII.

EXAMPLE VII

Pinene (426 grams) was heated to 120° C. and $P_2S_5$ (174 grams)—a molar ratio of 4:1—was added slowly over a period of 55 minutes. This mixture was then heated to 150° C. and maintained at this temperature for 1 hour.

A quantity (117 grams) of the above pinene-$P_2S_5$ reaction product was then mixed with 41.5 grams of mineral oil (S. U. V.=45 seconds at 210° F.) and with 41.5 grams of the above described wax-phenyl benzoate (4–18) (containing ⅓ of its weight of mineral oil). The resulting mixture was then heated at 150° C. for one hour at 6–8 mms. pressure to remove volatile components. When the reaction product obtained in this manner was blended in oil (S. U. V.=45 seconds at 210° F.) to provide a 1% blend, there was no haze in the oil until 63 days had passed. In contrast, the product obtained by similarly treating 117 grams of the pinene-$P_2S_5$ reaction product with 83 grams of the same mineral oil hazed in the oil, a 1% blend showing haze in 7 days.

Still another means for counteracting the haze problem is that illustrated by Example VIII below.

EXAMPLE VIII

One hundred grams of pinene, 50 grams of an S. A. E. 10 grade mineral oil and 50 grams of wax-phenyl benzoate (4–18) (described in Table 1 above) were warmed to 110° C. and 41 grams of $P_2S_5$ were added thereto. The ratio of pinene to $P_2S_5$ is 4:1. The reaction mixture so obtained was heated at 150° C. for one hour, and was thereafter heated to 150° C. under vacuum, thereby removing volatile products. The reaction product thus obtained was blended in oil (S. U. V.=45 seconds at 210° F.) to provide a 3% blend; the blend was still clear after standing 10 days, whereas the same oil containing 3% of Product III, to which this product may be compared, developed a haze after 1 day.

The amount of secondary inhibitor necessary to effect the desired inhibition will depend upon concentration of primary inhibitor in the oil and will also depend upon the type of mineral oil fraction used. In general, however, from about 10% to about 100% by weight of the secondary inhibitor based upon the primary inhibitor present will substantially inhibit haze formation. The amount of primary oxidation inhibitor which is generally used in oil is from about 0.01% to about 5%, with amounts of the order of 0.1–1.0% preferred. Accordingly, the amount of secondary inhibitor used generally is from about 0.001% to about 5%.

As indicated hereinabove, the primary and secondary inhibitors of this invention may be incorporated in a viscous mineral oil fraction in any one of several ways. For example, a secondary inhibitor may be added to an oil fraction containing a primary inhibitor, or the primary inhibitor added to an oil fraction containing a secondary inhibitor. Also, the secondary inhibitor may be added to the reactants used in the preparation of the primary inhibitor—namely, a phosphorus sulfide and a dicyclic terpene—and in such case will be present during the reaction. It appears that, under such conditions, the secondary inhibitor reacts with the phosphorus sulfide and the dicyclic terpene to form a complex product. The product obtained in this manner is then added to the oil fraction. Still another procedure which may be used involves adding the secondary inhibitor to the reaction mixture of the phosphorus sulfide and dicyclic terpene before the completion of the reaction; then a small amount of the resulting product is added to an oil fraction. Another procedure is that of reacting the dicyclic terpene-phosphorus sulfide reaction product with the secondary inhibitor at an elevated temperature, such as 100° C. to 160° C., such as shown in Example VII above, and then adding the desired amount of the resulting reaction product to the oil. It will be apparent, therefore, that the mineral oil compositions of this invention are complex in nature for it is possible that the primary inhibitor and the secondary inhibitor may be present individually in a mineral oil fraction, or may also be present therein as a physical combination or, further, may be present therein in the form of a single chemical composition. In the same connection, it will also be apparent that a primary inhibitor and a secondary inhibitor in a mineral oil composition of the type contemplated herein may enter into chemical reaction when the oil composition is used as a lubricant under certain conditions such, for example, as a lubricant in an engine operating at relatively high temperatures.

In view of the foregoing, the term "mineral oil composition", as used herein and as recited in all of the appended claims is inclusive of all mineral oil factions containing a primary oxidation inhibitor and a secondary inhibitor, and is inclusive of oil compositions obtained or prepared by any of the several procedures hereinabove described. Thus, any of the oil compositions obtained or prepared by any of the foregoing procedures is substantially free of haze normally occurring in an oil composition containing a primary oxidation inhibitor but not containing a secondary inhibitor.

Mineral oil concentrates are also contemplated herein, such concentrates containing substantially larger concentrations of primary inhibitor and secondary inhibitor than those enumerated above. That is, relatively large amounts of the said materials may be incorporated in an oil fraction in which they are readily soluble, and the oil concentrate so obtained may thereafter be diluted with a suitable quantity of the said oil fraction prior to use.

It is to be understood that the examples, procedures and oil compositions described hereinabove are illustrative only and not to be construed as limiting the scope of this invention thereto. For example, all dicyclic terpenes as broadly described above may be used in place of those shown in Examples I through IV. Correspondingly, any phosphorus sulfide may be used in place of phosphorus pentasulfide shown in the examples, but the latter is preferred. Also the mineral oils disclosed above are but typical of all viscous mineral oil fractions which may be used herein. Finally, the secondary inhibitors shown above are preferred of this class but are only representative of the various esters or organic carboxylic acids and wax-substituted hydroxy-aromatic compounds.

This invention is a continuation-in-part of application Serial No. 482,482, filed April 9, 1943, by the present applicants, Everett W. Fuller and Henry S. Angel, with John H. McCracken; oil compositions containing the dicyclic terpene-phosphorus sulfide reaction products described hereinabove form the subject matter of said application Serial No. 482,482.

We claim:

1. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature of from about 100° C. to about 190° C., of a phosphorus sulfide and a material selected from the group consisting of a dicyclic terpene and an essential oil predominantly comprised of a dicyclic terpene, and having in combination therewith a minor proportion, sufficient to suppress the formation of haze therein, of a wax-substituted hydroxyaromatic ester of an organic carboxylic acid.

2. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature of from about 100° C. to about 190° C., of a phosphorus sulfide and a material selected from the group consisting of a dicyclic terpene and an essential oil predominantly comprised of a dicyclic terpene, and having in chemical combination therewith a minor proportion, sufficient to suppress the formation of haze therein, a wax-substituted hydroxyaromatic ester of an organic carboxylic acid.

3. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of a phosphorus sulfide and a material selected from the group consisting of a dicyclic terpene and an essential oil predominantly comprised of a dicyclic terpene, and having in combination therewith a minor proportion, sufficient to suppress the formation of haze therein, of a wax-substituted hydroxyaromatic ester of an organic carboxylic acid.

4. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature of from about 100° C. to about 190° C., of substantially one mol of phosphorus sulfide and four mols of a material selected from the group consisting of a dicyclic terpene and an essential oil predominantly comprised of a dicyclic terpene, and having in combination therewith a minor proportion, sufficient to suppress the formation of haze therein, of a wax-substituted hydroxyaromatic ester of an organic carboxylic acid.

5. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of a material selected from the group consisting of a dicyclic terpene and an essential oil predominantly comprised of a dicyclic terpene, and having in combination therewith a minor proportion, sufficient to suppress the formation of haze therein, of a wax-substituted hydroxyaromatic ester of an organic carboxylic acid.

6. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of a material selected from the group consisting of a dicyclic terpene and an essential oil predominantly comprised of a dicyclic terpene, said material being admixed with a diluent substantially inert in said reaction, and having in combination therewith a minor proportion, sufficient to suppress the formation of haze therein, of a wax-substituted hydroxyaromatic ester of an organic carboxylic acid.

7. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of pinene, and having in combination therewith a minor proportion, sufficient to suppress the formation of haze therein, of a wax-substituted hydroxyaromatic ester of an organic carboxylic acid.

8. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of pinene, said pinene being admixed with substantially an equal weight of a petroleum oil diluent substantially inert in said reaction, and having in combination therewith a minor proportion, sufficient to suppress the formation of haze therein, of a wax-substituted hydroxyaromatic ester of an organic carboxylic acid.

9. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of turpentine oil, and having in combination therewith a minor proportion, sufficient to suppress the formation of haze therein, of a wax-substituted hydroxyaromatic ester of an organic carboxylic acid.

10. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of turpentine oil, said turpentine oil being admixed with substantially an equal weight of a petroleum oil diluent substantially inert in said reaction, and having in combination therewith a minor proportion, sufficient to suppress the formation of haze therein, of a wax-substituted hydroxyaromatic ester of an organic carboxylic acid.

11. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature of from about 100° C. to above 190° C., of substantially one mol of phosphorus pentasulfide and four mols of pinene, and having in combination therewith a minor proportion, sufficient to suppress the formation of haze therein, of a wax-substituted hydroxyaromatic ester of an aliphatic carboxylic acid.

12. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature above about 100° C. of substantially one mol of phosphorus pentasulfide and four mols of pinene, and having in combination therewith a minor proportion, sufficient to suppress the formation of haze therein, of a wax-substituted hydroxyaromatic ester of an aromatic carboxylic acid.

13. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of pinene, and having in combination therewith a minor proportion, sufficient to suppress the formation of haze therein, of a wax-phenyl benzoate.

14. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and substantially four mols of pinene, and having in combination therewith a minor proportion, sufficient to suppress the formation of haze therein, of tetrawax-phenyl benzoate.

15. A mineral oil composition normally susceptible to the formation of haze therein, comprising a viscous mineral oil fraction containing a minor proportion, sufficient to stabilize said oil fraction against the deletrious effects of oxidation, of a phosphorus- and sulfur-containing reaction product obtained by reaction, at a temperature between about 100° C. and about 160° C., of substantially one mol of phosphorus pentasulfide and four mols of pinene, and having in combination therewith a minor proportion, sufficient to suppress the formation of haze therein, of a wax-phenyl phthalate.

16. A mineral oil composition normally susceptible to the formation of haze therein, comprising a viscous mineral oil fraction containing a minor proportion, sufficient to stabilize said oil fraction against the deleterious effects of oxidation, of a phosphorus- and sulfur-containing reaction product obtained by reaction, at a temperature between about 100° C. and about 160° C., of substantially one mol of phosphorus pentasulfide and four mols of pinene, and having in combination therewith a minor proportion, sufficient to suppress the formation of haze therein, of tetra-wax phenyl phthalate.

17. A mineral oil composition normally susceptible to the formation of haze therein, comprising a viscous mineral oil fraction containing a minor proportion, from about 0.01 per cent to about 5.0 per cent, of a phosphorus- and sulfur-containing reaction product obtained by reaction, at a temperature of from about 100° C. to about 190° C., of a phosphorus sulfide and a material selected from the group consisting of a dicyclic terpene and an essential oil predominantly comprised of a dicyclic terpene, and having in combination therewith a minor proportion, from about 0.001 per cent to about 5 per cent, of a wax-substituted hydroxyaromatic ester of an organic carboxylic acid.

18. A mineral oil concentrate comprising a viscous mineral oil fraction having in admixture therewith: (1) a phosphorus- and sulfur-containing reaction product obtained by reaction at a temperature of from about 100° C. to about 190° C. of a phosphorus sulfide and a material selected from the group consisting of a dicyclic terpene and an essential oil predominantly comprised of a dicyclic terpene and (2) a minor proportion of a wax-substituted hydroxyaromatic ester of an organic acid; the quantity of said reaction product and of said ester in said concentrate being greater than about 5.0 per cent, the relative proportions of said reaction product and said ester therein being such that when said concentrate is diluted with mineral oil, the mineral oil composition so formed will contain from about 0.01 per cent to about 5.0 per cent of said reaction product and from about 0.001 per cent to about 5.0 per cent of said ester.

EVERETT W. FULLER.
HENRY S. ANGEL.

REFERENCES CITED

The following references are of record in the file of this patent:

UNITED STATES PATENTS

| Number | Name | Date |
| --- | --- | --- |
| 2,381,377 | Angel et al. | Aug. 7, 1945 |
| 2,373,094 | Berger et al. | Apr. 10, 1945 |
| 2,371,763 | Lazer et al. | Mar. 20, 1945 |
| 2,356,073 | May | Aug. 15, 1944 |
| 2,048,466 | Reiff | July 21, 1936 |
| 2,048,465 | Reiff | July 21, 1936 |

Certificate of Correction

Patent No. 2,455,668.	December 7, 1948.

EVERETT W. FULLER ET AL.

It is hereby certified that errors appear in the printed specification of the above numbered patent requiring correction as follows:

Column 2, line 45, for "thone" read *than*; line 47, for "action is" read *action product is*; column 3, line 55, for the word "those" read *these*; column 8, line 63, for "factions" read *fractions*; column 9, line 62, claim 2, for "therein, a" read *therein, of a*; column 11, line 51, claim 11, for "above" read *about*; line 65, claim 12, strike out "above about 100° C. of" and insert instead *of from about 100° C. to about 190° C.*; column 12, line 27, claim 15, for "deletrious" read *deleterious*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*